(12) United States Patent
Kumakura et al.

(10) Patent No.: US 12,294,078 B2
(45) Date of Patent: *May 6, 2025

(54) AS A POSITIVE ELECTRODE ACTIVE MATERIAL FOR RECHARGEABLE LITHIUM ION BATTERIES

(71) Applicants: UMICORE, Brussels (BE); UMICORE KOREA LTD., Chungcheongnam-do (KR)

(72) Inventors: Shinichi Kumakura, Tokyo (JP); TaeHyeon Yang, Chungcheongnam-do (KR); Jens Paulsen, Chungcheongnam-do (KR); Maxime Blangero, Chungcheongnam-do (KR); Elsye Agustina, Chungcheongnam-do (KR)

(73) Assignees: UMICORE, Brussels (BE); UMICORE KOREA LTD., Chungcheongnam-do (KR)

( * ) Notice: Subject to any disclaimer, the term of this patent is extended or adjusted under 35 U.S.C. 154(b) by 593 days.

This patent is subject to a terminal disclaimer.

(21) Appl. No.: 17/623,688

(22) PCT Filed: Jul. 2, 2020

(86) PCT No.: PCT/EP2020/068723
§ 371 (c)(1),
(2) Date: Dec. 29, 2021

(87) PCT Pub. No.: WO2021/001500
PCT Pub. Date: Jan. 7, 2021

(65) Prior Publication Data
US 2022/0271274 A1    Aug. 25, 2022

(30) Foreign Application Priority Data

Jul. 3, 2019   (EP) .................................... 19184165
Jul. 3, 2019   (EP) .................................... 19184186
Jul. 3, 2019   (EP) .................................... 19184201

(51) Int. Cl.
*H01M 4/36*      (2006.01)
*H01M 4/02*      (2006.01)
(Continued)

(52) U.S. Cl.
CPC ......... *H01M 4/366* (2013.01); *H01M 4/0471* (2013.01); *H01M 4/505* (2013.01);
(Continued)

(58) Field of Classification Search
None
See application file for complete search history.

(56) References Cited

U.S. PATENT DOCUMENTS 6,787,232  B1 *  9/2004  Chiang ................ H01M 4/131
                                                          423/625
10,483,537 B2 *  11/2019 Choi ..................... C01G 53/42
(Continued)

FOREIGN PATENT DOCUMENTS

CN      102627332 A      8/2012
CN      102832389 A      12/2012
(Continued)

OTHER PUBLICATIONS

ISA/EP; International Search Report and Written Opinion for International Patent Application No. PCT/EP2020/068723 dated Sep. 18, 2020, 11 pages.
(Continued)

*Primary Examiner* — Kevin M Bernatz
(74) *Attorney, Agent, or Firm* — NK Patent Law

(57) ABSTRACT

A positive electrode active material powder suitable for lithium-ion batteries, comprising lithium transition metal-based oxide particles comprising a core and a surface layer, said surface layer being on top of said core, said particles
(Continued)

comprising the elements: Li, a metal M' and oxygen, wherein the metal M' has a formula: $M'=(Ni_zMn_yCo_x)_{1-k}A_k$, wherein A is a dopant, $0.55 \leq z \leq 0.89$, $0.05 \leq y \leq 0.25$, $0.05 \leq x \leq 0.25$, $x+y+z+k=1$, and $k \leq 0.01$, said positive electrode active material powder having a mean particle size D50 ranging from 3 μm to 15 μm and a surface layer thickness ranging from 5 nm to 200 nm. The surface layer comprises aluminum in a content superior or equal to 0.04 wt % and inferior or equal to 0.15 wt % relative to the total weight of the positive electrode active material.

9 Claims, 7 Drawing Sheets

(51) Int. Cl.
  *H01M 4/04* (2006.01)
  *H01M 4/505* (2010.01)
  *H01M 4/525* (2010.01)
  *H01M 10/0525* (2010.01)

(52) U.S. Cl.
  CPC ....... *H01M 4/525* (2013.01); *H01M 10/0525* (2013.01); *H01M 2004/028* (2013.01); *H01M 2220/20* (2013.01)

(56) References Cited

U.S. PATENT DOCUMENTS

| | | | |
|---|---|---|---|
| 10,790,510 B2* | 9/2020 | Kim | H01M 10/0567 |
| 12,002,954 B2 | 6/2024 | Fukamichi et al. | |
| 2003/0035999 A1* | 2/2003 | Gao | C01G 53/42 |
| | | | 423/598 |
| 2004/0258836 A1 | 12/2004 | Besenhard et al. | |
| 2015/0093641 A1 | 4/2015 | Mitsumoto et al. | |
| 2015/0104708 A1* | 4/2015 | Bi | H01M 4/525 |
| | | | 264/618 |
| 2016/0099460 A1 | 4/2016 | Toyama et al. | |
| 2016/0218359 A1* | 7/2016 | Kim | H01M 4/366 |
| 2016/0351900 A1* | 12/2016 | Sekiya | H01M 4/131 |
| 2017/0179479 A1 | 6/2017 | Park et al. | |
| 2017/0294651 A1 | 10/2017 | Choi et al. | |
| 2017/0309909 A1 | 10/2017 | Paulsen et al. | |
| 2018/0019464 A1* | 1/2018 | Xia | H01M 10/0525 |
| 2018/0034045 A1* | 2/2018 | Xia | H01M 4/0471 |
| 2018/0269477 A1 | 9/2018 | Zhu et al. | |
| 2018/0316008 A1* | 11/2018 | Arimura | C01G 53/006 |
| 2021/0057745 A1* | 2/2021 | Dai | H01M 4/525 |
| 2022/0052334 A1 | 2/2022 | Fukamichi et al. | |
| 2022/0255067 A1* | 8/2022 | Blangero | H01M 4/366 |
| 2022/0271275 A1* | 8/2022 | Blangero | H01M 4/364 |
| 2022/0271282 A1* | 8/2022 | Blangero | H01M 4/0471 |
| 2022/0271328 A1* | 8/2022 | Blangero | H01M 4/364 |
| 2022/0278321 A1* | 9/2022 | Blangero | H01M 4/525 |
| 2023/0216040 A1* | 7/2023 | Laine | H01M 4/62 |
| | | | 429/231.95 |
| 2023/0335713 A1* | 10/2023 | Qiao | H01M 4/1391 |
| 2023/0378452 A1* | 11/2023 | Kim | H01M 4/485 |
| 2023/0378461 A1* | 11/2023 | Kim | H01M 4/5825 |

FOREIGN PATENT DOCUMENTS

| | | | |
|---|---|---|---|
| CN | 103715424 | A | 4/2014 |
| CN | 104347853 | A | 2/2015 |
| CN | 106058188 | A | 10/2016 |
| CN | 107207281 | A | 9/2017 |
| CN | 107210422 | A | 9/2017 |
| CN | 108023077 | A | 5/2018 |
| CN | 108807887 | A | 11/2018 |
| CN | 109037649 | A | 12/2018 |
| CN | 109075327 | A | 12/2018 |
| CN | 109256533 | A | 1/2019 |
| JP | 2001006672 | A | 1/2001 |
| JP | 2002015739 | A | 1/2002 |
| JP | 2003020229 | A | 1/2003 |
| JP | 2006073482 | A | 3/2006 |
| JP | 2008166269 | A | 7/2008 |
| JP | 2009146739 | A | 7/2009 |
| JP | 2010129471 | A | 6/2010 |
| JP | 5204913 | B1 | 6/2013 |
| JP | 2015069958 | A | 4/2015 |
| JP | 2017506805 | A | 3/2017 |
| JP | 2018506141 | A | 3/2018 |
| JP | 2018508943 | A | 3/2018 |
| JP | 2018510450 | A | 4/2018 |
| JP | 2018106892 | A | 7/2018 |
| JP | 2019021623 | A | 2/2019 |
| JP | 2019509605 | A | 4/2019 |
| JP | 2022504208 | A | 1/2022 |
| KR | 101547972 | B1 | 7/2015 |
| WO | 2013021955 | A1 | 2/2013 |
| WO | 2015065098 | A2 | 5/2015 |
| WO | 2016116867 | A1 | 7/2016 |
| WO | 2017055977 | A1 | 4/2017 |
| WO | 2017078136 | A1 | 5/2017 |
| WO | 2017055977 | | 6/2017 |
| WO | 2017168274 | A1 | 10/2017 |

OTHER PUBLICATIONS

WIPO; International Preliminary Report on Patentability for International Patent Application No. PCT/EP2020/068723 dated Nov. 4, 2021, 54 pages.
USPTO: Non-final Office Action for co-pending U.S. Appl. No. 17/623,720, mailed Aug. 6, 2024, 33pages.
USPTO: Non-final Office Action for co-pending U.S. Appl. No. 17/623,676, mailed Aug. 1, 2024, 32 pages.
USPTO: Non-final Office Action for co-pending U.S. Appl. No. 17/623,729, mailed Sep. 20, 2024, 39 pages.
USPTO: Non-final Office Action for co-pending U.S. Appl. No. 17/623,694, mailed Sep. 12, 2024, 40 pages.
USPTO: Non-final Office Action for U.S. Appl. No. 17/623,682, mailed Oct. 31, 2024, 39 pages.
USPTO: Final Office Action for U.S. Appl. No. 17/623,694, mailed Jan. 13, 2025, 29 pages.

\* cited by examiner

AS A POSITIVE ELECTRODE ACTIVE MATERIAL FOR RECHARGEABLE LITHIUM ION BATTERIES

CROSS-REFERENCE TO RELATED APPLICATIONS

This application is a U.S. National Stage application of International Patent Application No. PCT/EP2020/068723, filed on Jul. 2, 2020, which claims the benefit of European Patent Application No. 19184165.9, filed on Jul. 3, 2019, and the benefit of European Patent Application No. 19184186.5, filed on Jul. 3, 2019, and the benefit of European Patent Application No. 19184201.2, filed on Jul. 3, 2019.

TECHNICAL FIELD AND BACKGROUND

This invention relates to a lithium nickel (manganese) cobalt-based oxide positive electrode active material powder for lithium-ion secondary batteries (LIBs) suitable for electric vehicle (EV) and hybrid electric vehicles (HEV) applications, comprising lithium transition metal-based oxide particles having a core provided with a surface layer on top of the core. The particles comprises the elements: Li, a metal M' and oxygen, wherein the metal M' has a formula: M'=$(Ni_zMn_yCo_x)_{1-k}A_k$, wherein A is a dopant, $0.50 \leq z \leq 0.89$, $0.05 \leq y \leq 0.25$, $0.05 \leq x \leq 0.25$, $x+y+z+k=1$, and $k \leq 0.01$.

A positive active material is defined as a material which is electrochemically active in a positive electrode. By active material, it must be understood a material capable to capture and release Li ions when subjected to a voltage change over a predetermined period of time.

In particular, the present invention concerns a high nickel (manganese) cobalt-based oxide positive electrode active material—hereafter referred to as "hN(M)C compound"—i.e. a hN(M)C compound wherein the atomic ratio of Ni to M' is of at least 50.0 at %.

In the framework of the present invention, at % signifies atomic percentage. The at % or "atom percent" of a given element expression of a concentration means how many percent of all atoms in the claimed compound are atoms of said element.

The weight percent (wt %) of a first element E ($E_{wt1}$) in a material can be converted from a given atomic percent (at %) of said first element E ($E_{at1}$) in said material by applying the following formula:

$$E_{wt1} = \frac{(E_{at1} \times E_{aw1})}{\sum_{i=1}^{n}(E_{ati} \times E_{awi})} \times 100\%,$$

wherein the product of $E_{at1}$ with $E_{aw1}$, $E_{aw1}$ being the atomic weight (or molecular weight) of the first element E, is divided by the sum of $E_{ati} \times E_{awi}$ for the other elements in the material. n is an integer which represents the number of different elements included in the material.

With the developments of EVs and HEVs, it comes along a demand for lithium-ion batteries eligible for such applications and hN(M)C compounds are more and more explored as solid candidates to be used as positive electrode active materials of LIBs, because of its relatively cheap cost (with respect to alternative such as lithium cobalt oxide compounds) and higher capacities.

Although hN(M)C compounds are promising for the above-mentioned advantages, they also present disadvantages such as a deterioration of the cycling stability with Ni atomic contents higher than 50.0%.

Presently, there is therefore a need to achieve hN(M)C compounds having sufficiently high first discharge capacity (i.e. of at least 175mAh/g) and cycle life (i.e. at least 1900 cycles at 25° C. until the LIB reaches around 80% retained capacity) whilst retaining a necessary low fading rate QF1C (i.e. of no more than 12%) at an operating voltage of at least 4.0V, which is, in the framework of the present invention, a prerequisite for the use of such a hN(M)C compound in LIBs suitable for (H)EV applications.

It is an object of the present invention to provide a positive electrode active material powder having an improved cycle life of at least 1900 cycles at 25° C. and an improved first charge capacity of at least 175mAh/g, said parameters being obtained by the analysis methods of the present invention.

SUMMARY OF THE INVENTION

This objective is achieved by providing a positive electrode active material powder according to claim 1 which comprises a surface layer having aluminum in a content superior or equal to 0.04 wt % and inferior or equal to 0.15 wt % with respect to the total weight of the positive electrode active material powder.

Moreover, said surface layer comprises $LiAlO_2$ and $LiM''_{1-a}Al_aO_2$, wherein Al substitutes M'' which comprises Ni, Mn, and Co.

In the surface layer, the $LiAlO_2$ phase content is superior or equal to 0.10 at % and inferior or equal to 0.30 at % with respect to the total atomic content of M' of the positive electrode active material powder.

$LiM''_{1-a}Al_aO_2$ phase content in the surface is superior to 0.00 at % and inferior to 0.14 at % with respect to the total atomic content of M' of the positive electrode active material powder.

The positive electrode active material powder according to the invention has a median particle size D50 ranging from 3 μm to 15 μm and a surface layer thickness ranging from 5 nm to 200 nm.

It is indeed observed that an improved cycle life of more than 1900 cycles with a capacity retention of 80% at 25° C. and an improved first discharge capacity of more than 175mAh/g are achieved with a positive electrode active material powder according to EX1 having the following features:
- the aluminum content in the surface layer is of 0.10 wt %, with respect to the total weight of the powder,
- The $LiAlO_2$ content is 0.15 at % with respect to the total atomic content of M' of the powder,
- The $LiM''_{1-a}Al_aO_2$ content is 0.08 at % with respect to the total atomic content of M' of the powder.

The particles of EX1 powder have a surface layer with an averaged 10 nm thickness and their size distribution is characterized by a D50 of 3.9 μm.

The present invention concerns the following embodiments:

Embodiment 1

In a first aspect, the present invention concerns a positive electrode active material powder suitable for lithium-ion batteries, comprising lithium transition metal-based oxide particles, said particles comprising a core and a surface layer, said surface layer being on top of said core, said particles comprising the elements:

Li, a metal M' and oxygen, wherein the metal M' has a formula: M'=$(Ni_zMn_yCo_x)_{1-k}A_k$, wherein A is a dopant, $0.50 \leq z \leq 0.89$, $0.05 \leq y \leq 0.25$, $0.05 \leq x \leq 0.25$, x+y+z+k=1, and k≤0.01, said positive electrode active material powder having a median particle size D50 ranging from 3 µm to 15 µm and a surface layer thickness ranging from 1 nm to 200 nm, preferably from 5 nm to 200 nm, said surface layer comprising aluminum in a content superior or equal to 0.04 wt % and inferior or equal to 0.15 wt % with respect to the total weight of the positive electrode active material powder, said surface layer comprising a $LiAlO_2$ phase and a LiM"$O_2$ phase with M" comprising Al, Ni, Mn, and Co, said $LiAlO_2$ being present in said surface layer in a content which is superior or equal to 0.10 at % and inferior or equal to 0.30 at % with respect to the total atomic content of M' of the positive electrode active material powder, said LiM"$O_2$ phase being present in a content which is superior to 0.00 at % and inferior to 0.14 at % with respect to the total atomic content of M' of the positive electrode active material powder.

Preferably, in this 1$^{st}$ Embodiment, the surface layer has a thickness from 5 nm to 15 nm, more preferably from 5 nm to 50 nm, most preferably from 5 nm to 100 nm.

The thickness can also be included in range going from 5 nm to 150 nm.

Preferably, $0.60 \leq z \leq 0.89$.
More preferably, $0.70 \leq z \leq 0.89$.
Most preferably, $0.60 \leq z \leq 0.86$.
Upmost preferably, z<89.

The source of A can be fed into the slurry during the co-precipitation step of precursor preparation or can be blended afterwards with the prepared precursor followed by heating. For instance, the source of A can be a nitrate, an oxide, a sulfate, or a carbonate compound, but not limited to these examples. The dopant is generally added to improve the performance of the positive electrode active material such as to support lithium diffusion or suppress the side reaction with electrolyte. The dopant is generally homogeneously distributed in a core. The dopant in a positive electrode active material is identified by a combination of analytical methods such as a combination of an Inductively Coupled Plasma (ICP) method and TEM-EDS (transmission electron microscopy-energy dispersive X-ray spectroscopy).

Embodiment 2

In a second embodiment, preferably according to Embodiment 1, the particles of said positive electrode active material powder according to the invention comprises aluminum and has an XPS pattern comprising a maximum Al2p peak intensity in the range of binding energies going from 73.0±0.1 eV to 74.5±0.2 eV, preferably 73.6±0.2 eV to 74.0±0.2 eV, said intensity being obtained by XPS spectrum analysis.

A maximum peak of Al2p in the range from 73.6 eV to 74.0 eV indicates that the major Al form in a surface layer is $LiAlO_2$. The hN(M)C compound having a maximum peak of Al2p in the range from 73.6 eV to 74.0 eV exhibits a higher specific capacity (showed in Table 5) and better cycle life of the battery (showed in Table 6) as illustrated in Table 8.

Embodiment 3

In a third embodiment, preferably according to the Embodiment 1 or 2, said lithium transition metal-based oxide particles have an Al coverage A1/A2 that is superior or equal to 100, wherein A1 is an atomic ratio Al/(Ni+Mn+Co+Al+S) of the elements Al, Ni, Mn, Co, and S contained in the surface layer, said atomic ratio A1 being obtained by XPS spectrum analysis and wherein A2 is an atomic ratio Al/(Ni+Mn+Co+Al+S) obtained by ICP.

A1 is obtained by the following method comprising the successive steps of 1) acquiring an XPS spectrum of the lithium transition metal-based oxide particles;
2) deconvoluting said XPS spectrum so as to identify three distinctive peaks (Al peak1, Al peak2, and Al peak3) having three respective areas (area_1, area_2, area_3), assigned to LiM"$_{1-a}Al_aO_2$ (Al peak1; area_1) $LiAlO_2$ (Al peak2; area_2), and $Al_2O_3$(Al peak3 area_3) compounds, respectively;
3) calculating the total Al2p peak area value by summing the areas (_1 to _3) of said three distinctive peaks; and
4) converting said value of the Al2p peak area into an atomic ratio A1 (at %/at %)=(Al/(Ni+Mn+Co+Al+S))

The step 4) is obtained according to the following method comprising the successive steps of a) fitting the primary XPS peaks of Ni, Mn, Co, and S using Thermo Scientific Avantage software with a Smart background function so as to obtain the peak area of each elements;
b) converting the obtained, Ni, Mn, Co, and S peak area from Step 4 a) and Al peak area obtained from step 3) to at % using Thermo Scientific Avantage software and Scofield relative sensitivity library.
c) converting said Al2p at % to Al by dividing the value of Al at % with the total of Ni, Mn, Co, Al, and S at %.

A value of Al surface coverage A1/A2 of at least 100 indicates that a uniform distribution of Al in the surface layer is present on top of the core. A hN(M)C compound having a uniform distribution of Al in the surface layer exhibits higher specific capacity (showed in Table 5) and better cycle life of the battery (showed in Table 6) as illustrated in Table 9.

Embodiment 4

In a fourth embodiment, preferably according to any of the preceding Embodiments, the hNMC cathode material according to the invention has a monolithic morphology.

A monolithic morphology stands for a morphology of a single particle or of a secondary particle consisting of two or three primary particles, observed in proper microscope techniques like Scanning Electron Microscope (SEM). A powder is referred to as a monolithic powder in case 80% or more of particles in a field of view of: at least 45 µm×al least 60 µm (i.e. of at least 2700 µm$^2$), preferably of: at least 100 µm×100 µm (i.e. of at least 10 000 µm$^2$) provided by SEM have the monolithic morphology. A polycrystalline morphology stands for a morphology of secondary particle consisting of more than three primary particles. Examples of SEM images for particles with monolithic and polycrystalline morphologies are displayed in FIG. 1A and FIG. 1B, respectively.

Embodiment 5

In a fifth embodiment, preferably according to any of the preceding Embodiments, the positive electrode active material powder has a general formula: $Li_{1+a}((Ni_zMn_yCo_{x'}Al_{v})_{1-k}A_k)_{1-a}O_2$, wherein only A is a dopant, wherein:

0.50≤z'≤0.89, 0.05≤y'≤0.25, 0.05≤x'≤0.25, x'+y'+z'+v+k=1, 0.0014≤v≤0.0054, −0.05≤a'≤0.05, and k≤0.01.

Preferably, 0.60≤z'≤0.89.
More preferably, 0.70≤z'≤0.89.
Most preferably, 0.60≤z'≤0.86.
Upmost preferably, z'<89.

Embodiment 6

In a sixth embodiment, preferably according to any of the preceding Embodiments, A is either one or more of Al, B, S, Mg, Zr, Nb, W, Si, Ba, Sr, Ca, Zn, Cr, V, Y, and Ti.

Embodiment 7

In a 7$^{th}$ embodiment, preferably according to any of the previous Embodiments, the thickness of the surface layer is defined as a minimum distance between a first point located at a periphery of a cross-section of each of the particles and a second point located in a line defined between said first point and a geometric center (or centroid) of said particle, wherein a crystal structure transition is observed by STEM at the second point location. The crystal structure transition could consists in a transition from mixed cubic and spinel structures in the surface layer to a layered structure in the core of the particle.

All the above-provided Embodiments 1 to 7 are combinable.

The present invention concerns a use of the positive electrode active material powder according to any of the preceding Embodiments 1 to 7 in a battery.

The present invention is also inclusive of a process for manufacturing the positive electrode active material powder according to any of the preceding Embodiments 1 to 7, comprising the steps of:

Preparing a lithium transition metal-based oxide compound, mixing said lithium transition metal-based oxide compound with a source of aluminum ion, preferably with $NaAlO_2$, thereby obtaining a mixture, and heating the mixture in an oxidizing atmosphere in a furnace at a temperature between 350° C. and less than 500° C., preferably at most 450° C., for a time between 1 hour and 10 hours so as to obtain the positive electrode active material powder according to the present invention.

DETAILED DESCRIPTION

Figure 1A:
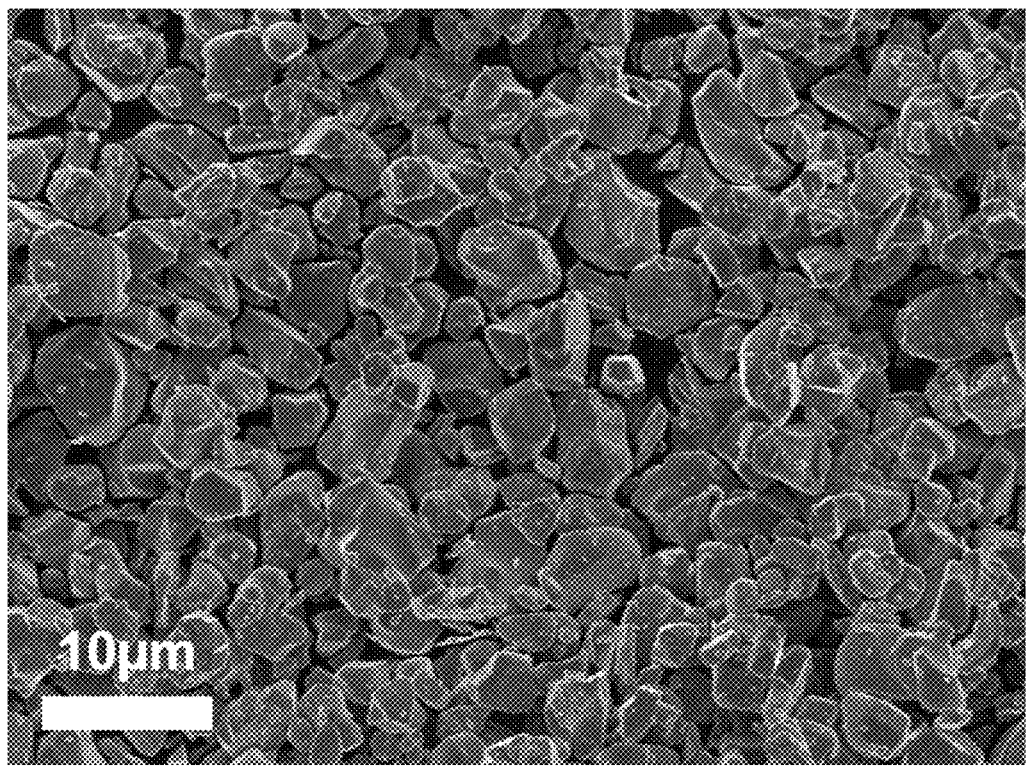
FIG. 1A. SEM image for particles with a monolithic morphology
Figure 1B:
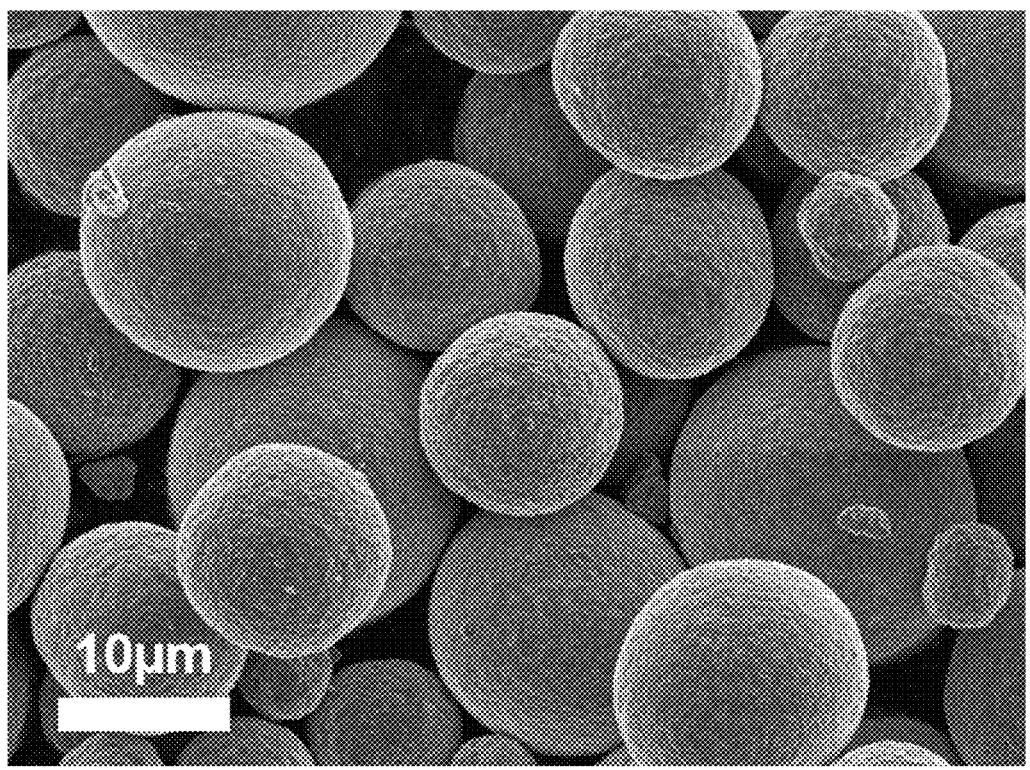
FIG. 1B. SEM image for particles with a polycrystalline morphology

In the drawings and the following detailed description, preferred embodiments are described so as to enable the practice of the invention. Although the invention is described with reference to these specific preferred embodiments, it will be understood that the invention is not limited to these preferred embodiments. The invention includes numerous alternatives, modifications and equivalents that are apparent from consideration of the following detailed description and accompanying drawings.

The following analysis methods are used in the Examples:

A. Coin Cell Test

A1. Coin Cell Preparation

For the preparation of a positive electrode, a slurry that contains positive electrode active material powder, conductor (Super P, Timcal) and binder (KF #9305, Kureha)—with a formulation of 90:5:5 by weight—in a solvent (NMP, Mitsubishi) is prepared using a high-speed homogenizer. The homogenized slurry is spread on one side of an aluminum foil using a doctor blade coater with a 230 μm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as a negative electrode. 1M $LiPF_6$ in EC:DMC (1:2) is used as electrolyte and is dropped between separator and electrodes. Then, the coin cell is completely sealed to prevent leakage of the electrolyte.

A2. Testing Method

Each coin cell is cycled at 25° C. using Toscat-3100 computer-controlled galvanostatic cycling stations (from Toyo). The coin cell testing schedule used to evaluate samples is detailed in Table 2. The schedules use a 1 C current definition of 160 mA/g and comprise the evaluation of rate performance at 0.1 C in the 4.3V~3.0V/Li metal window range. The initial charge capacity CQ1 and discharge capacity DQ1 are measured in constant current mode (CC).

QF1C is the capacity fade rate extrapolated to 100 cycle and calculated as:

$$QF1C(\%/100) = \left(1 - \frac{DQ_{35}}{DQ_8}\right) \times \frac{100}{27} \times 100$$

TABLE 2

Coin cell testing schedule

| | Charge | | | | Discharge | | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.10 | — | 30 | 4.3 | 0.10 | — | 30 | 3.0 |
| 2 | 0.25 | 0.05 C | 10 | 4.3 | 0.20 | — | 10 | 3.0 |
| 3 | 0.25 | 0.05 C | 10 | 4.3 | 0.50 | — | 10 | 3.0 |
| 4 | 0.25 | 0.05 C | 10 | 4.3 | 1.00 | — | 10 | 3.0 |
| 5 | 0.25 | 0.05 C | 10 | 4.3 | 2.00 | — | 10 | 3.0 |
| 6 | 0.25 | 0.05 C | 10 | 4.3 | 3.00 | — | 10 | 3.0 |
| 7 | 0.25 | 0.1 C | 10 | 4.5 | 0.10 | — | 10 | 3.0 |

TABLE 2-continued

Coin cell testing schedule

| | Charge | | | | Discharge | | | |
|---|---|---|---|---|---|---|---|---|
| Cycle No | C Rate | End current | Rest (min) | V/Li metal (V) | C Rate | End current | Rest (min) | V/Li metal (V) |
| 8 | 0.25 | 0.1 C | 10 | 4.5 | 1.00 | — | 10 | 3.0 |
| 9~33 | 0.50 | 0.1 C | 10 | 4.5 | 1.00 | — | 10 | 3.0 |
| 34 | 0.25 | 0.1 C | 10 | 4.5 | 0.10 | — | 10 | 3.0 |
| 35 | 0.25 | 0.1 C | 10 | 4.5 | 1.00 | — | 10 | 3.0 |

B1. Full Cell Preparation

650mAh (flexible) pouch-type cells are prepared as follows: the positive electrode active material, conductor (Super-P, Timcal), graphite (KS-6, Timcal) as conductive agents, and polyvinylidene fluoride (PVDF 1710, Kureha) as a binder are added to N-methyl-2-pyrrolidone (NMP) as a dispersion medium so that the mass ratio of the positive electrode active material powder, conductive agents, and binder is set at 92/3/1/4. Thereafter, the mixture is kneaded to prepare a mixture slurry. The resulting mixture slurry is then applied onto both sides of a current collector, made of a 15 µm thick aluminum foil. The width of the applied area is 43 mm and the length is 405 mm. The typical loading weight of a positive electrode active material is about 11.5±0.2 mg/cm². The electrode is then dried and calendared using a pressure of 120 kgf (1176.8N) to an electrode density of 3.4±0.05 g/cm³. In addition, an aluminum plate serving as a cathode current collector tab is arc-welded to an end portion of the positive electrode.

Commercially available negative electrodes are used. In short, a mixture of graphite, carboxy-methyl-cellulose-sodium (CMC), and styrenebutadiene-rubber (SBR), in a mass ratio of 96/2/2, is applied on both sides of a 10 µm thick copper foil. A nickel plate serving as a negative electrode current collector tab is arc-welded to an end portion of the negative electrode. A typical loading weight of a negative electrode active material is 8±0.5 mg/cm².

Non-aqueous electrolyte is obtained by dissolving lithium hexafluorophosphate (LiPF$_6$) salt at a concentration of 1.0 mol/L in a mixed solvent of ethylene carbonate (EC), ethyl methyl carbonate (EMC), and diethyl carbonate (DEC) in a volume ratio of 1:1:1.1 wt % vinylene carbonate (VC), 0.5 wt % Lithium bis(oxalato)borate (LiBOB), 1 wt % LiPO$_2$F$_2$ are introduced in the above electrolyte as additives.

A sheet of positive electrode, negative electrode, and a separator made of a 20 µm thick microporous polymer film (Celgard® 2320, Celgard) interposed between them are spirally wound using a winding core rod in order to obtain a spirally-wound electrode assembly. The assembly and the electrolyte are then put in an aluminum laminated pouch in a dry room with dew point of −50° C., so that a flat pouch-type lithium secondary battery is prepared. The design capacity of the secondary battery is 650mAh when charged to 4.2V. The non-aqueous electrolyte solution is impregnated for 8 hours at room temperature. The battery is pre-charged to 15% of its expected capacity and aged for a day at room temperature. The battery is then degassed, and the aluminum pouch is sealed. The battery is prepared for use as follows: the battery is charged using a current of 0.2 C (with 1 C=650 mA) in CC mode (constant current) up to 4.2V, then in CV mode (constant voltage) until a cut-off current of C/20 is reached, before the discharge in CC mode at 0.5 C rate, down to a cut-off voltage of 2.7V.

B2. Full Cell Cycle Life Test

The prepared full cell battery is charged and discharged several times under the following conditions at 25° C., to determine their charge-discharge cycle performance:
charge is performed in CC mode under 1 C rate up to 4.2V, then CV mode until C/20 is reached,
the cell is then set to rest for 10 minutes,
discharge is done in CC mode at 1 C rate down to 2.7V,
the cell is then set to rest for 10 minutes,
the charge-discharge cycles proceed until the battery reaches around 80% retained capacity.

Every 100 cycles, one discharge is done at 0.2 C rate in CC mode down to 2.7V.

C. Inductively Coupled Plasma (ICP) Analysis

The composition of positive electrode active material compounds is measured by the inductively coupled plasma (ICP) method using an Agilent ICP 720-ES. 1 g of powder sample is dissolved into 50 mL high purity hydrochloric acid in an Erlenmeyer flask. The flask is covered by a watch glass and heated on a hot plate at 380° C. until complete dissolution of the precursor. After being cooled to room temperature, the solution of the Erlenmeyer flask is poured into a 250 mL volumetric flask. Afterwards, the volumetric flask is filled with deionized water up to the 250 mL mark, followed by complete homogenization. An appropriate amount of solution is taken out by pipette and transferred into a 250 mL volumetric flask for the 2nd dilution, where the volumetric flask is filled with internal standard and 10% hydrochloric acid up to the 250 mL mark and then homogenized. Finally, this solution is used for ICP measurement. The atomic ratio of Al to the total amount of Ni, Mn, Co, Al, and S (Al/(Ni+Mn+Co+Al+S) (at %) is named A2.

D. X-Ray Photoelectron Spectroscopy (XPS) Analysis

D1. Measurement Condition

In the present invention, X-ray photoelectron spectroscopy (XPS) is used to identify and to determine the content (in at %) of each of the Al-based compounds or phases present in the surface layer of the cathode material particles according to the invention.

Such an identification includes to perform: i) a fitting of Al2p peaks identified by XPS (cfr. section D2—XPS peak treatment) followed by ii) a quantitative phase analysis by calculating of the content for each of the compounds identified by the fitting of the Al2p peaks (cfr. section D3—content of Al-based compounds).

Also, XPS is used in the framework of the present invention to measure an Al surface coverage value which indicates the degree of homogeneity of said Al distribution in the surface layer of the particles according to the present invention.

D2. XPS Peak Treatment

In XPS measurement, the signal is acquired from the first few nanometers (e.g. 1 nm to 10 nm) of the sample surface layer. Therefore, all elements measured by XPS are contained in the surface layer. It is assumed that the surface layer has a homogeneous distribution of the identified phases.

The quantitative phase analysis of XPS raw data is based on the treatment of XPS signals leading to a deconvolution of XPS peaks and to the determination of the contributions of the existing Al-based compounds to the deconvoluted peaks.

The XPS peak deconvolution is conducted to obtain the different contributions of atomic Al-based compounds including LiM"$_{1-a}$Al$_a$O$_2$, LiAlO$_2$, and Al$_2$O$_3$ in the surface layer of investigated positive electrode active material particles. Al$_2$O$_3$ compound formed from the heating of NaAlO$_2$ that is not reacted with Li on the surface.

The XPS peaks measured for the positive electrode active material powder according to the invention are essentially a combination of multiple sub-peaks located within a narrow range of binding energies. An Al2p peak having a maximum intensity appearing (or centered) at a range of binding energies going from 70 eV to 79 eV consists of contributions from different sub-peaks of different Al containing compounds. The location (position of the maximum intensity) of each sub-peak is different from each other.

The XPS signal treatment including XPS peak deconvolution process in this invention follows the steps provided hereunder:

Step 1) removal of background by a linear function,

Step 2) deciding an equation of a fitting model,

Step 3) deciding the constraints of variables in the equation of a fitting model, Step 4) deciding the initial values of variables before a calculation, Step 5) executing the calculation Step 1) Removal of Background by a Linear Function In this invention, the XPS signal treatment is performed using a spectrum of an Al2p narrow scan in the range from 65±0.5 eV to 85±0.5 eV, wherein the spectrum comprises an Al2p peak having a maximum intensity (or being centered) in a range from 70 eV to 85 eV and overlaps with Ni3p peaks, each of these peaks having a maximum intensity (or being centered) in a range from 65 eV to 71 eV. The background of the measured data point is linearly baselined at the range from 65.0±0.5 eV to 81.5±0.5 eV.

Step 2) Deciding an Equation of a Fitting Model

There are four sub-peaks of a Ni3p peak and three sub-peaks of an Al2p peak peak centered in the range from 65.0±0.5 eV to 81.5±0.5 eV. The peaks are labelled as Ni3p1, Ni3p1 satellite, Ni3p2, Ni3p2 satellite, Al peak1, Al peak2, and Al peak3. The satellite peak is a minor additional peak appearing at a few eV higher binding energy than its primary peak. It is associated with the unfiltered X-Ray source from anode material in the XPS instrument. Al peaks 1 to 3 correspond to the compounds present in the particle surface layer, each are related to the: i) LiM"1-aAlaO2, ii) LiAlO2, and iii) Al2O3 phases, respectively.

Table 1 shows the reference of the maximum peak intensity position range for the $LiM''_{1-a}Al_aO_2$, $LiAlO_2$, and $Al_2O_3$ phases. The range of binding energy of Al peak1 varies with the amount of Al doped in the structure.

TABLE 1

XPS peak reference

| Peak | Binding Energy range (eV) | Compound attributed | Literature reference |
|---|---|---|---|
| Al peak1 | 72.6-73.1 | $LiM''_{1-a}Al_aO_2$ | Chem. Mater. Vol. 19, No. 23, 5748-5757, 2007; J. Electrochem. Soc., 154 (12) A1088-1099, 2007; and Chem. Mater. Vol. 21, No. 23, 5607-5616, 2009. |
| Al peak2 | 73.5-73.9 | $LiAlO_2$ | |
| Al peak3 | 73.9-74.3 | $Al_2O_3$ | Moulder, J. F., Handbook of XPS, Perkin-Elmer, 1992 |

The equation of a fitting model is according to the pseudo-Voigt equation which is a combination of Gaussian and Lorentzian functions commonly used for XPS peak fitting. The equation is:

$$y = y_o + A'\left[m_u \frac{2}{\pi} \frac{w}{4(x-x_c)^2 + w^2} + (1-m_u)\frac{\sqrt{4\ln 2}}{\sqrt{\pi}w} e^{\frac{4\ln 2}{w^2}(x-x_c)^2}\right]$$

with $y_o$=an offset, $x_c$=a center position of the sub-peak, $A'$=an area of sub-peak, w=a width of sub-peaks (full width at half maximum or FWHM), and $m_u$=a profile shape factor.

Step 3) Deciding the Constraints of Variables in the Equation of a Fitting Model The constraints of five variables ($y_0$, $x_c$, $A'$, w, $m_u$) are described hereunder:

$y_0$ (offset):
  $y_0$ of all 7 sub-peaks are 0.

$x_c$ (a center position of the sub-peak):
  $X_c$ of Ni3p1≥66.0 eV;
  $X_c$ of Ni3p1≤$X_c$ of Ni3p1 satellite−0.7 eV;
  $X_c$ of Ni3p1 satellite≤$X_c$ of Ni3p2−0.7 eV;
  $X_c$ of Ni3p2≤72 eV
  $X_c$ of Ni3p2≤$X_c$ of Ni3p2 satellite−0.7 eV;
  72.3 eV≤$X_c$ of Al peak1≤73.3 eV;
  73.5 eV≤$X_c$ of Al peak2≤73.9 eV; and
  73.9 eV≤$X_c$ of Al peak3≤74.3 eV.

The ranges of $X_c$ for Al peaks 1 to 3 are determined from Chem. Mater. Vol. 19, No. 23, 5748-5757, 2007; J. Electrochem. Soc., 154 (12) A1088-1099, 2007; and Chem. Mater. Vol. 21, No. 23, 5607-5616, 2009.

$A'$ (area of sub-peaks):
  $A'$ of Ni3p1*0.1≤$A'$ of Ni3p1 satellite*1.2≤$A'$ of Ni3p1;
  $A'$ of Ni3p2*0.1≤$A'$ of Ni3p2 satellite; and
  $A'$ of all 7 sub-peak are superior to 1.0.

w (width of sub-peaks):
  1.2≤w≤1.8

$M_u$ (profile shape factor):
  0.1≤$m_u$≤0.9

Step 4) Deciding the Initial Values of Variables Before a Calculation

A calculation for fitting sub-peaks is reproducible when the initial values of variables are obtained by the following procedure.

1) The initial values of $y_0$, w, $m_u$ are respectively set to 0, 1.5, and 0.7.

2) The initial values of $x_c$ of sub-peaks Ni3p1, Ni3p1 satellite, Ni3p2, Ni3p2 satellite, Al peak1, Al peak2, and Al peak3 are 67.0 eV, 68.0 eV, 69.0 eV, 70.0 eV, 73.0 eV, 73.7 eV, and 74.3 eV, respectively.

3) The initial values of $A'$ of the sub-peaks Ni3p1, Ni3p1 satellite, Ni3p2, and Ni3p2 satellite are obtained by the following procedure:

3.a) The $A'$ of sub-peak of Ni3p1 is a maximum peak intensity of a Ni3p peak multiplied by a 1.5 factor, wherein the shape of the peak is estimated as a triangle having a base of 3 eV.

3.b) The $A'$ of the sub-peak of Ni3p2 is 60% of that of Ni3p1.

3.c) The $A'$ of the sub-peak of Ni3p1 satellite is 80% of that of Ni3p1.

3.d) The $A'$ of the sub-peak of Ni3p2 satellite is 80% of that of Ni3p2.

4) The initial values of $A'$ of the sub-peaks Al peak1, Al peak2, and Al peak3 are obtained by a following procedure.

4.a) $A'$ values of the three sub-peaks of Al2p are calculated according to the following equation:

A'=Fraction Factor (FF)×Estimated Area×Normalization Factor (NF)

A fraction Factor (FF) is a function of $x_c$ of three sub-peaks of Al2p in the range from $x_o$ to $x_n$ where $x_o$=72.8 eV and $x_n$=74.6 eV. The intensity of Al peak1 linearly decreases from $x_n$ to $x_o$.

4.b) The intensity of Al peak3 linearly increases from $x_n$ to $x_o$. The intensity of Al peak2, which is located between Al peak1 and Al peak3, has therefore the highest intensity at its center 73.7 eV. The Fraction Factor (FF) for each sub-peak is calculated according to the below equations:

$$FF \text{ of Al peak } 1 = \frac{x_n - x_c}{x_n - x_o};$$

$$FF \text{ of Al peak } 2 = -4 \cdot \left(\left(\frac{x_n - x_c}{x_n - x_o}\right) - 0.5\right)^2;$$

$$FF \text{ of Al peak } 3 = x_n - \left(\frac{x_n - x_c}{x_n - x_o}\right).$$

The estimated area is a maximum peak intensity of an Al2p peak*2.5, wherein the shape of the peak is estimated as a triangle having a base of 5 eV.

4.c) A Normalization Factor (NF) is added to subtract the overlapping area from the total calculated peak when the sub-peaks are summed. It is important because the first two components in the peak area (A') equation (Fraction Factor and Estimated Area) include some overlapped regions which render the calculated intensity excessively high. In the calculation method, sub-peaks are simplified so as to be considered like a triangle shape with a height t and a base b. The locations of a maximum intensity are $x_c$ for Al peak1, Al peak2, and Al peak3 which are 73.0V, 73.7 eV, and 74.3 eV for, respectively. All sub-peaks are assumed to have the same size and shape with base is set to be 3 eV. Normalization factor for each sub-peak is calculated as:

$NF$ of Al peak 1 =

$$\frac{\text{Al peak 1}}{\text{overlapped Al peak 1}} = \frac{\left(\frac{1}{2} \cdot 3 \cdot t\right)}{\left(\frac{1}{2} \cdot 3 \cdot t\right) + \left(\frac{1}{2} \cdot 2.3 \cdot \frac{23}{30}t\right)} = 0.57;$$

$$NF \text{ of Al peak 2} = \frac{\text{Al peak 2}}{\text{overlapped Al peak 2}} =$$

$$\frac{\left(\frac{1}{2} \cdot 3 \cdot t\right)}{\left(\frac{1}{2} \cdot 3 \cdot t\right) + \left(\frac{1}{2} \cdot 2.3 \cdot \frac{23}{30}t\right) + \left(\frac{1}{2} \cdot 2.4 \cdot \frac{24}{30}t\right) + \left(\frac{1}{2} \cdot 1.7 \cdot \frac{17}{30}t\right)} = 0.39; \text{ and}$$

$NF$ of Al peak 3 =

$$\frac{\text{Al peak 3}}{\text{overlapped Al peak 3}} = \frac{\left(\frac{1}{2} \cdot 3 \cdot t\right)}{\left(\frac{1}{2} \cdot 3 \cdot t\right) + \left(\frac{1}{2} \cdot 2.4 \cdot \frac{24}{30}t\right) + \left(\frac{1}{2} \cdot 1.7 \cdot \frac{17}{30}t\right)} = 0.51.$$

Table 3 shows the example of initial values of variables for EX1.

TABLE 3

Example of initial values of variables for EX1

| Parameter | Ni 3s1 | Ni 3s1 satellite | Ni 3s2 | Ni 3s2 satellite | Al peak1 | Al peak2 | Al peak3 |
|---|---|---|---|---|---|---|---|
| $y_0$ | 0 | 0 | 0 | 0 | 0 | 0 | 0 |
| $x_c$ | 67.0 | 68.0 | 69.0 | 70.0 | 73.0 | 73.7 | 74.3 |
| A' | 13227.6 | 10582.1 | 7936.5 | 6349.2 | 5499.9 | 10301.4 | 8052.0 |
| w | 1.5 | 1.5 | 1.5 | 1.5 | 1.5 | 1.5 | 1.5 |
| $m_u$ | 0.7 | 0.7 | 0.7 | 0.7 | 0.7 | 0.7 | 0.7 |

Step 5) Executing the Calculation

The peak deconvolution process is assisted by a Solver tool, embedded in the Microsoft Excel software Version 1808. The minimum value of a target cell is set as the objective of the Solver calculation. The target cell returns the sum of squares of differences between a measured curve and a calculated curve. The calculation is terminated when the correlation coefficient between a measured curve and a calculated curve reaches 99.5% or more. When the number is closer to 100% it shows the shape of a calculated curve is closely matched with the shape of a measured curve. Otherwise, iterations will continue to reach the minimum value of the objective.

Figure 2:
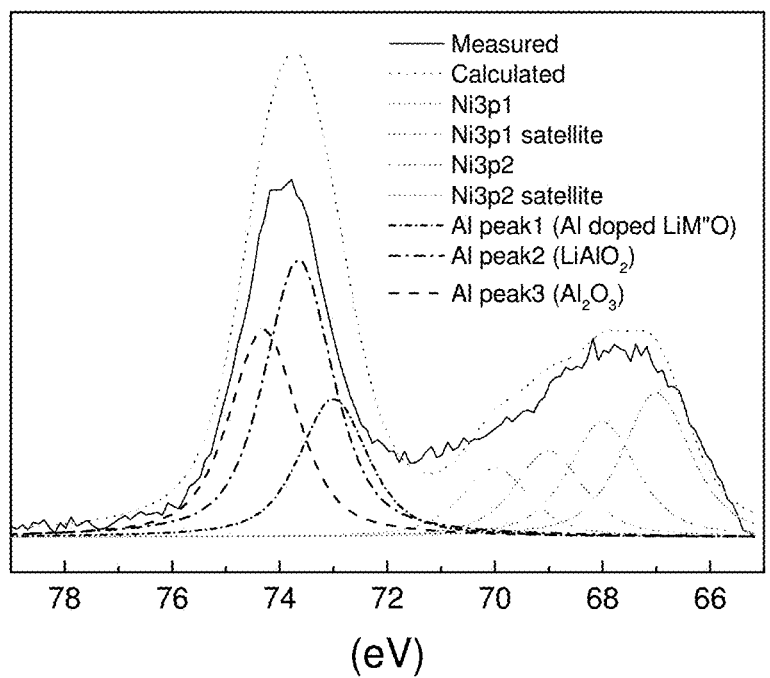
FIG. 2. XPS Al peak deconvolution of EX1 before fitting process (x-axis: binding energy, y-axis: count)
Figure 3:
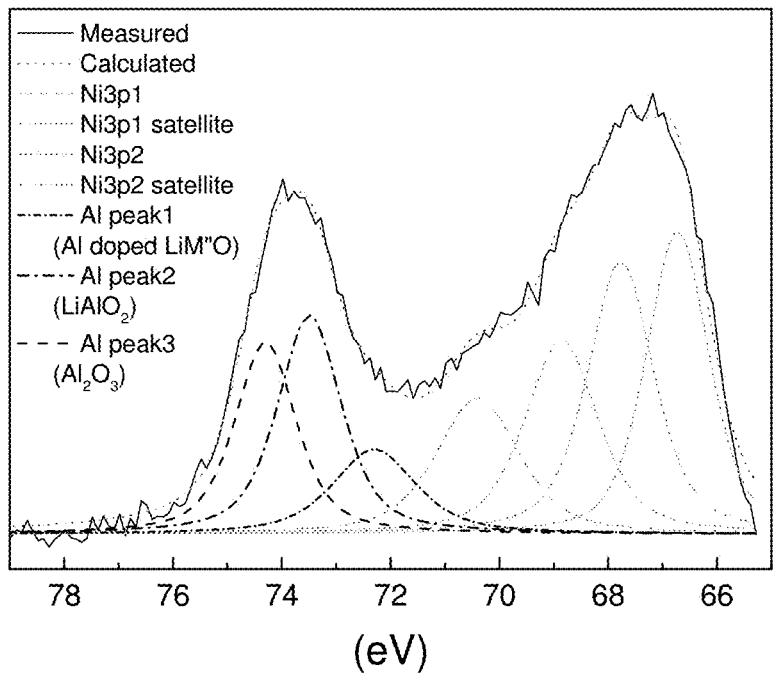
FIG. 3. XPS Al peak deconvolution of EX1 after fitting process (x-axis: binding energy, y-axis: count)
Figure 4:
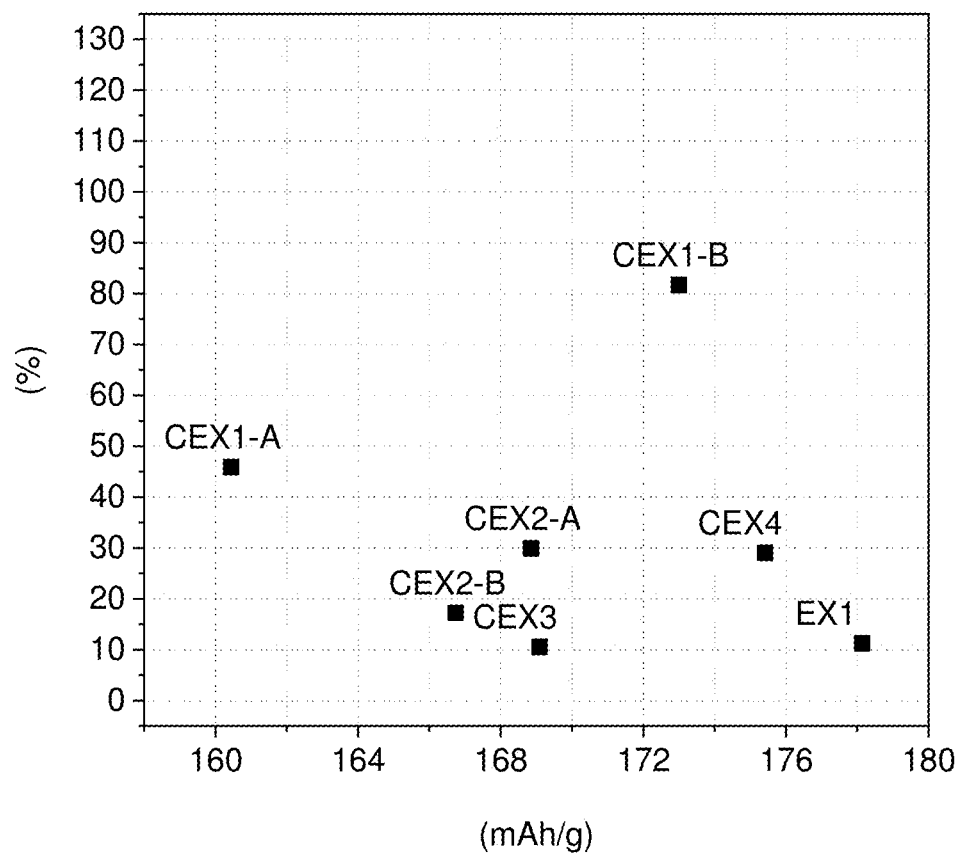
FIG. 4: DQ1 vs. QF1C graph of 4 μm monolithic NMC (x-axis: DQ1, y-axis: QF1C)

An Al2p peak of EX1 before and after fitting process is shown in FIG. 2 (x-axis: binding energy, y-axis: count) and FIG. 3 (x-axis: binding energy, y-axis: count), respectively. The result of calculated variables is shown in Table 4.

TABLE 4

Calculated parameter after fitting for EX1

| Parameter | Ni3p1 | Ni3p1 satellite | Ni3p2 | Ni3p2 satellite | Al peak1 | Al peak2 | Al peak3 |
|---|---|---|---|---|---|---|---|
| $y_0$ | 0 | 0 | 0 | 0 | 0 | 0 | 0 |
| $x_c$ | 66.7 | 67.8 | 68.9 | 70.4 | 72.3 | 73.5 | 74.3 |
| A' | 10583.9 | 10503.2 | 8302.3 | 6579.1 | 4222.3 | 8207.0 | 6950.1 |
| w | 1.4 | 1.4 | 1.6 | 1.8 | 1.8 | 1.4 | 1.3 |
| mu | 0.5 | 0.6 | 0.6 | 0.6 | 0.7 | 0.7 | 0.7 |

D3) Content of Al-Based Compounds Linked to Identified Al Sub-Peaks 1 to 3

The ratio of A' (area) of each Al sub-peak is directly converted to the relative atomic ratio among corresponding Al compounds in a surface layer by dividing the area of each Al sub-peak by the total area of all three Al sub-peaks. The amount of $LiM''_{1-a}Al_aO_2$, $LiAlO_2$, and $Al_2O_3$ is then provided with respect to the total atomic content of M' in the positive electrode active material powder.

For example, the relative atomic ratio of Al peak1 ($LiM''_{1-a}Al_aO_2$): Al peak2 ($LiAlO_2$): Al peak3 ($Al_2O_3$) is 23 at %:42 at %:35 at % in the surface layer of EX1 based on Table 4. Since the total content of aluminum is contained in the surface layer of EX1 and is obtained by ICP analysis, the amount of $LiM''_{1-a}Al_aO_2$, $LiAlO_2$, and $Al_2O_3$ with respect to the total atomic content of M' of the positive electrode active material powder is obtained by multiplying the atomic percentage of Al/M' in the positive electrode active material powder (measured by ICP) and the relative atomic ratio of each Al sub-peaks (measured by XPS). For example, the amount of $LiAlO_2$ in EX1 is 0.36 at % (Al/M')*42% ($LiAlO_2/(LiM''_{1-a}Al_aO_2+LiAlO_2+Al_2O_3$)=0.15 at %.

D4) XPS Peak Integration and Coverage

All primary peaks for other elements except Al2p are fitted using the Thermo Scientific Avantage software with a Smart background function. The Smart background is a Shirley-type baseline with the constraint that background intensity must be lower than the data point intensity. An Al2p peak integrated area is calculated as the total area of Al peak1, Al peak2, and Al peak3 in B2) XPS deconvolution process. Scofield relative sensitivity library is used for the calculation of atomic fractions from the integrated peak area. The atomic ratio of Al to the total amount of Ni, Mn, Co, Al, and S (Al/(Ni+Mn+Co+Al+S) (at %) is named A1.

The Al surface coverage value is calculated as the fraction of Al on the surface of particle (A1), measured by XPS, divided by the Al fraction in the particle (A2), measured by ICP.

The surface coverage of the positive electrode active material by Al is calculated as follow:

$$\text{Al surface coverage} = \frac{Al/M^*(XPS)}{Al/M^*(ICP)} = \frac{A1}{A2}$$

Where $M^*$ is the total atomic fraction of Ni, Mn, Co, Al, and S of the positive electrode active material particles.

The surface coverage by Al indicates the degree of coverage of the positive active electrode active material particles by aluminum. If Al surface coverage value is high, the Al compound covers the surface with a homogenous distribution.

E. Scanning Transmission Electron Microscopy (STEM)

To examine the Al distribution within the particles, cross-sectional TEM lamella of particle is prepared by a Helios Nanolab 450 hp (FEI, USA, https://www.nanolabtechnologies.com/helios-nanolab-450-fei/) Dual Beam Scanning Electron Microscope-Focused Ion Beam (SEM-FIB). Ga ion beam is used with 30 kV voltage and 30 pA-7 nA current. The etched sample has a dimension of 5×8 µm with 100 nm thickness. STEM imaging is conducted on the sample using GRAND ARM 300F (JEOL, https://www.jeol.co.jp/en/products/detail/JEM-ARM300F.html) with 300 kV acceleration voltage. Resolution is 0.063 mm and detector angle is 8 C (54-200 mrad).

F) PSD Measurement

A particle-size distribution (PSD) is measured using a Malvern Mastersizer 3000 with Hydro MV wet dispersion accessory after dispersing the powder in an aqueous medium. In order to improve the dispersion of the powder, sufficient ultrasonic irradiation and stirring is applied, and an appropriate surfactant is introduced. D10, D50, and D90 are defined as the particle size at 10%, 50%, and 90% of the cumulative volume % distribution. A span is defined as span=(D90–D10)/D50.

G. Results

The invention is further illustrated by the following (non-limitative) examples:

Comparative Example 1

A monolithic NMC CEX1-A and CEX1-B are obtained through a core preparation (process A), a milling process (process B) and drying (process C) steps running as follows:

Process A. Core Preparation:

This double sintering process is a solid-state reaction between a Li source and a mixed transition metal precursor (referred to as MTH hereafter):

A1) Co-precipitation: MTH having a general formula of $M'(OH)_2$ wherein $M'=Ni_{0.625}Mn_{0.175}Co_{0.200}$, is prepared by the process described in KR101547972B1 (from page 6 number 25 to page 7 number 32). The MTH has a D50 of around 4 µm.

A2) $1^{st}$ blending: to obtain a lithium deficient sintered precursor, $Li_2CO_3$ and the precursor are homogenously blended with a Li/M' ratio of 0.80.

A3) $1^{st}$ firing: the blend from the $1^{st}$ blending step is sintered at 895° C. for 9 hours under air atmosphere in a furnace. The sintered blocks are crushed. The product obtained from this step is a powderous lithium deficient sintered precursor with Li/M'=0.80.

A4) $2^{nd}$ blending: the lithium deficient sintered precursor is blended with $LiOH.H_2O$ to correct the Li stoichiometry to Li/M'=1.045.

A5) $2^{nd}$ firing: the blend from the $2^{nd}$ blending is sintered at 920° C. for 9 hours in an air containing atmosphere in a furnace. The sintered blocks are crushed.

Process B. Wet Milling:

B1) 1st milling: the crushed large agglomerated compound from A5 is milled to prepare the agglomerated intermediate NMC.

B2) 2nd milling—wet milling: To separate the obtained agglomerated intermediate particles from B1 into monolithic primary particles, a wet ball milling process is applied. 50 g of the agglomerated intermediate NMC is put in a 250 mL vessel with 50 mL deionized water and 1 cm $ZrO_2$ balls with a filling ratio of 50% of the volume of the vessel. The vessel is rotated on a commercial ball mill equipment for 15 hours which calculated milling speed is around 20 cm/s.

Process C. Filtering and Drying:

The wet milled solid powder is separated from water. The filtered wet milled compound is dried at 80° C. in a conventional oven with dry air. The dried monolithic high Ni NMC having D50 of 4.2 µm and span of 1.00 is labelled CEX1-A.

CEX1-B is obtained through a similar manner as the preparation of CEX1-A, except that an additional heat treatment at 375° C. for 10 hours is applied to the final product of Process C.

Optionally, a source of dopant can be added in the co-precipitation process in Step A1) or in the blending step in the Step A2) or A4) together with lithium source. Dopant can be added, for instance, to improve the electrochemical properties of the positive electrode active material powder product.

CEX1-A and CEX1-B are not according to the present invention.

Example 1

A monolithic NMC EX1, according to this invention, is obtained through a similar manner as the preparation of CEX1-A, except that 0.5 at % (Al vs. M') of $NaAlO_2$ is added during Process B2 and an additional heat treatment at 375° C. for 10 hours is applied to the final product of Process C.

Comparative Example 2

A monolithic NMC CEX2-A is obtained through a similar manner as the preparation of EX1, except that an additional heat treatment is not applied.

A monolithic NMC CEX2-B is obtained through a similar manner as the preparation of EX1, except that the additional heat treatment at 750° C. for 10 hours is applied instead of 375° C.

CEX2-A and CEX2-B are not according to the present invention.

Comparative Example 3

A monolithic NMC CEX3, which is not according to the present invention, is obtained through a similar manner as the preparation of EX1, except that 2.0 at % (Al vs. M') of NaAlO$_2$ is added during Process B2 instead of 0.5 at % of NaAlO$_2$.

Comparative Example 4

A monolithic NMC CEX4, which is not according to the present invention, is obtained through a following procedure. CEX1-A is dry-mixed with 0.5 at % (Al vs. M') of NaAlO$_2$ powder. The mixture is heated at 375° C. for 10 hours.

TABLE 5

Summary of the surface treatment condition and electrochemical properties of monolithic NMCs

| ID | According to Invention | Al (wt %) | Surface treatment method | Heat treatment at (° C.) | DQ1 (mAh/g) | QF1C (%) | Link to features of claim |
|---|---|---|---|---|---|---|---|
| CEX1-A | No | 0.00 | — | — | 160.44 | 45.90 | Low Al |
| CEX1-B | No | 0.00 | — | 375 | 173.01 | 81.64 | Low Al |
| EX1 | Yes | 0.10 | Wet | 375 | 178.14 | 11.24 | In this invention |
| CEX2-A | No | 0.10 | Wet | — | 168.86 | 29.91 | Low amount of LiAlO$_2$ |
| CEX2-B | No | 0.10 | Wet | 750 | 166.74 | 17.22 | High amount of LiM''$_{1-a}$Al$_a$O$_2$ |
| CEX3 | No | 0.52 | Wet | 375 | 169.10 | 10.52 | High Al |
| CEX4 | No | 0.14 | Dry | 375 | 175.42 | 29.04 | Low surface coverage |

Table 5 summarizes NaAlO$_2$ surface treatment condition with the electrochemical properties which is also mapped in FIG. 3. It is clearly seen that EX1 is superior than other material with different surface treatment conditions. A wet treatment method with additional heat treatment at 375° C. is effective to increase capacity while at the same time maintain its cycle stability.

Figure 5:
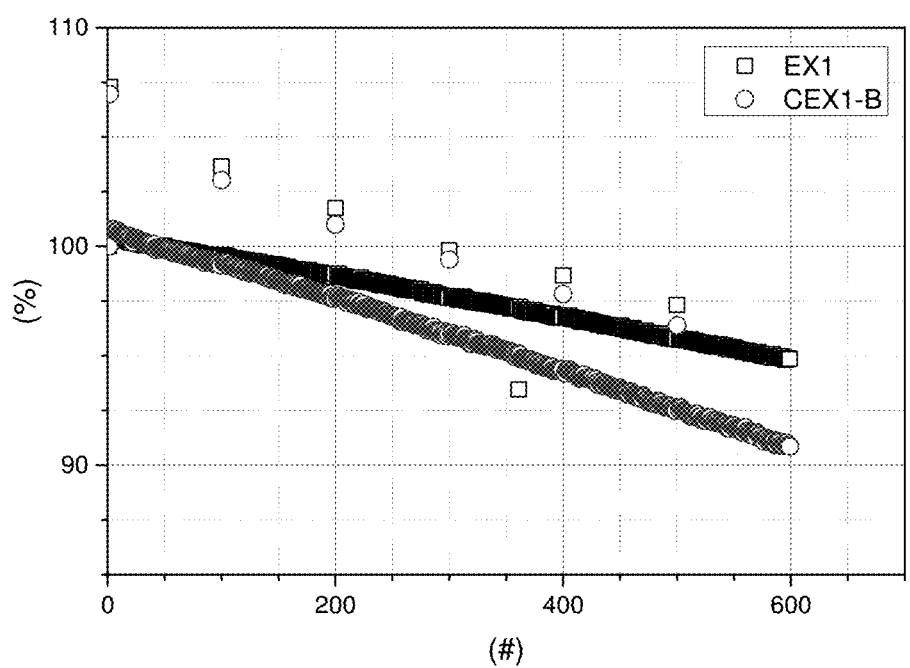
FIG. 5. Comparison of full cell cycle stability of EX1 and CEX1-B at 4.20V and 25° C. (x-axis: cycle number, y-axis: capacity retention)

FIG. 5 shows the full cell cycle performance of EX1 and CEX1-B at 4.20V and 25° C. The cycle life is defined as the number of charge-discharge cycles before the discharge capacity degrades to below 80% of the initial discharge capacity. The value of cycle life is extrapolated through a linear line equation and is shown in Table 6. It is clear that EX1 has a small gradient and reaches 80% of capacity after 2197 cycles.

TABLE 6

Full cell cycle life

| ID | According to Invention | Cycle life (#) |
|---|---|---|
| EX1 | Yes | 2197 |
| CEX1-B | No | 1263 |

Comparative Example 5

A polycrystalline NMC CEX5, which is not according to the present invention, is obtained by a double sintering process as discussed in the patent application WO2017042654A1 (from page 8 line 27 to page 9 line 7) as a following procedure:

A1) Co-precipitation: A metal bearing precursor is obtained by a precipitation in a pilot line. The process uses a larger-scale (about 100 L) CSTR. A feed of metal sulfate solution (2 mol/L M'SO$_4$, wherein M'=Ni$_{0.625}$Mn$_{0.175}$Co$_{0.200}$ and a feed of sodium hydroxide solution (10 mol/L NaOH) are supplied to the reactor. Additionally, a flow of NH$_4$OH solution (15 mol/L) is added as a complexing agent. The residence time—being the reactor volume divided by total flow rate—is 3 hours, and the temperature is set at 60° C. A protective atmosphere of N$_2$ is recommended to keep the level of impurities low. The collected precipitated metal bearing precursor slurry is filtered and washed by de-ionized water, and then dried at 150° C. for 24 hours under N$_2$ atmosphere, obtaining the mixed metal bearing precursor M'O$_{0.43}$(OH)$_{1.57}$ with metal composition M'=Ni$_{0.625}$Mn$_{0.175}$Co$_{0.200}$.

A2) Fractionation: Product from A1 process is classified into three metal bearing precursors which have different particle size by a fractionation technique. The process is done in a classifier with an air flow of 5~8 m$^3$ per a minute at 9000 RPM. From 50 kg powder injected into the equipment, 7.5 kg of coarse fraction (15% of total amount) is classified during the 1$^{st}$ fractionation. The remaining 42.5 kg of powder is re-classified in the 2$^{nd}$ fractionation to obtain 15 kg of fine fraction (30% of total amount) and 27.5 kg of powder (55% of total amount) of narrow span metal bearing precursor.

A3) 1$^{st}$ blending: LiOH.H$_2$O and narrow span precursor from Process A2 are homogenously blended with Li/M' ratio of 0.85.

A4) 1$^{st}$ sintering: the first blend is sintered at 700° C. for 11.5 hours in oxygen atmosphere. The sintered cake is crushed, classified and sieved to powder which is the lithium deficient sintered precursor A5) 2$^{nd}$ blending: the lithium deficient sintered precursor is blended with LiOH.H$_2$O in order to correct the Li stoichiometry to Li/M'=1.01.

A6) 2$^{nd}$ sintering: The blend from the 2$^{nd}$ blending is sintered at 805° C. for 10 hours in oxygen atmosphere. The 2$^{nd}$ sintered product is grinded and sieved to avoid the formation of agglomerates.

A7) Heat treatment: the compound from 2$^{nd}$ sintering step is heated at 375° C. for 10 hours in oxygen atmosphere to obtain positive electrode active material having D50 of 13.0 µm and span of 0.79. The positive electrode active material is labelled CEX5.

Example 2

A polycrystalline NMC EX2, according to the present invention, is obtained by a following procedure.

1 kg of CEX5, 1 L of deionized water, and 0.25 at % $NaAlO_2$ are put in a 5 L vessel and stirred for 2 hours by a overhead stirrer. The wet powder is separated from water. The separated wet compound is dried at 80° C. The dried compound is heated at 375° C. for 10 hours in oxygen atmosphere and named EX2.

Comparative Example 6

This example illustrates the manufacturing processes to produce a very high Ni monolithic NMC, and the characteristics of the products after each process step—the intermediate products being considered comparative examples.

A polycrystalline NMC CEX6, which is not according to the present invention, is obtained through a similar manner as the preparation of EX1, except that the Process A follows below.

A1) Co-precipitation: a MTH having a general composition of $M'(OH)_2$, wherein $M'=Ni_{0.90}Co_{0.10}$, is prepared by the process described in KR101547972B1. The MTH has a D50 of 4.4 µm.

A2) $1^{st}$ blending: LiOH and the MTH are homogenously blended with a Li/M' ratio of 0.80.

A3) $1^{st}$ sintering: the blend from the $1^{st}$ blending step is sintered at 730° C. for 11.5 hours under oxygen atmosphere. The product obtained from this step is a powderous lithium deficient sintered precursor with Li/M'=0.80

A4) $2^{nd}$ blending: the lithium deficient sintered precursor is blended with LiOH in order to correct the Li stoichiometry to Li/M'=1.01.

A5) $2^{nd}$ sintering: the blend from the $2^{nd}$ blending is sintered at 830° C. for 10 hours under 02 atmosphere in a furnace. The sintered blocks are crushed.

TABLE 7

Summary of the surface treatment condition and electrochemical properties of polycrystalline NMCs

| ID | According to Invention | Al (wt %) | Surface treatment method | Heat treatment at (° C.) | DQ1 (mAh/g) | Link to features of claim |
|---|---|---|---|---|---|---|
| CEX5 | No | 0.00 | — | 375 | 186.74 | Low Al |
| EX2 | Yes | 0.05 | Wet | 375 | 190.15 | |
| CEX6 | No | 0.10 | Wet | 375 | 122.62 | High Ni (z) |

Figure 6:
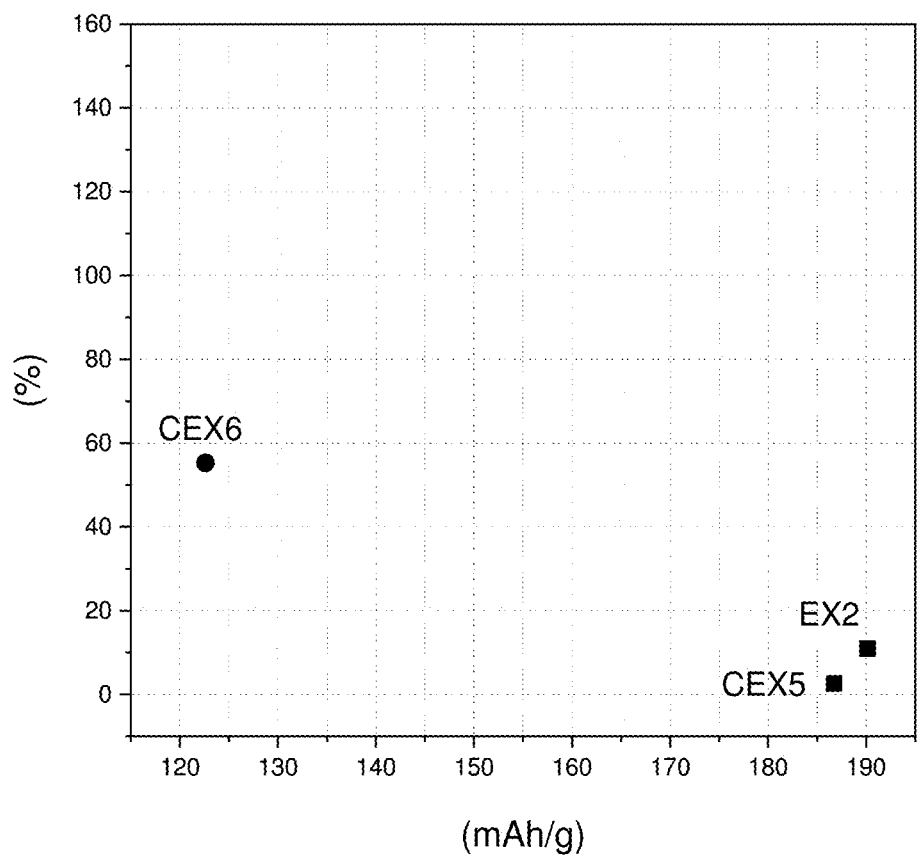
FIG. 6. DQ1 vs. QF1C graph of polycrystalline NMC (EX2 and CEX5) and high-Ni NMC (CEX6) (x-axis: DQ1, y-axis: QF1C)

Table 7 summarizes the surface treatment condition with the electrochemical properties which is also mapped in FIG. 6. It is shown that the surface treatment with the heat treatment at 375° C. works as well for EX2, the surface treatment for polycrystalline core. However, surface treatment for very high Ni NMC core (CEX6) is not as effective.

Comparative Example 7

CEX7-A is obtained through a similar manner as the preparation of CEX1-A, except that 2.0 at % of $NaAlO_2$ is added during Process B.

CEX7-B is obtained through a similar manner as the preparation of CEX1-A, except that 2.0 at % of $NaAlO_2$ is added during Process B and an additional heat treatment at 750° C. for 10 hours in air atmosphere is applied to the final product.

CEX1-A and 2 at % $Al_2O_3$ powder is dry-mixed and named CEX7-C.

CEX7-C is heated at 375° C. for 10 hours in air atmosphere and named CEX7-D.

CEX7-A, CEX7-B, CEX7-C, and CEX7-D are not according to this invention.

Figure 7:
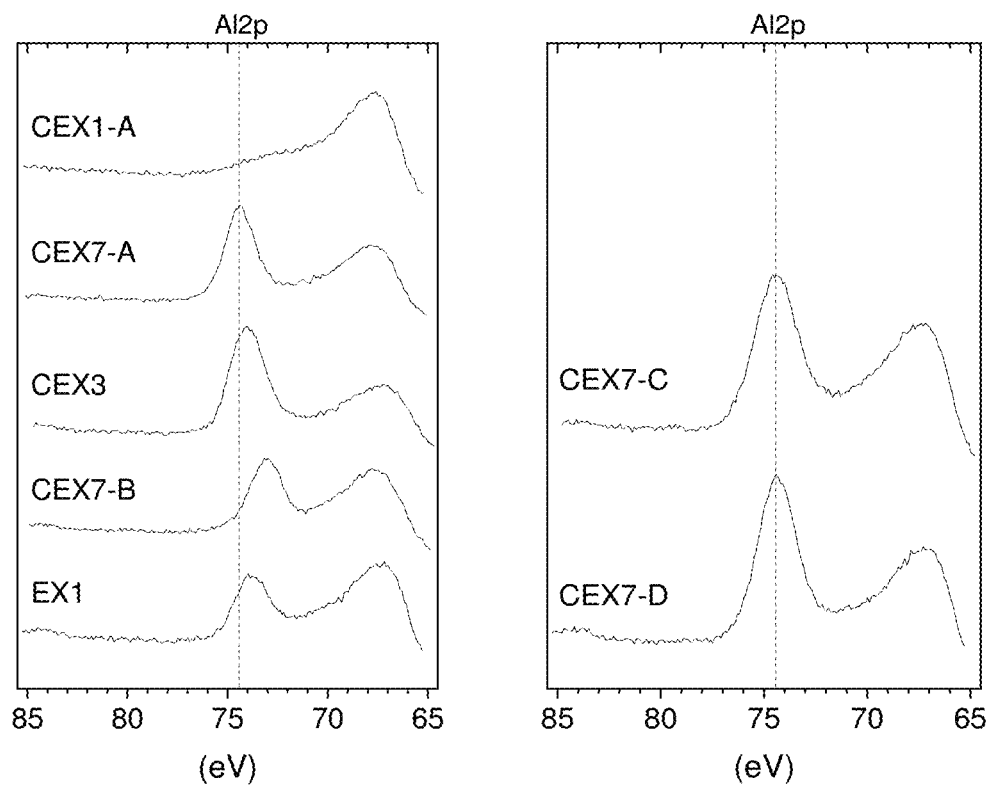
FIG. 7. Comparison of XPS Al2p peak for EX1, CEX1, CEX3, and CEX7 (x-axis: binding energy, y-axis: count)

To confirm the chemical composition of a surface layer, an Al2p peak is qualitatively analyzed. FIG. 7 shows an Al2p peak from XPS analysis. An Al2p peak as the primary Al peak appears in the binding energy area around 75-76 eV. The Al2p peak is detected in all samples except for CEX1-A. A guiding line is the maximum peak position of the Al2p peak in CEX7-A as the reference to visually observe the peak position shifting.

Table 8 summarizes maximum peak positions of Al2p peaks and quantification of Al compounds from peak deconvolution calculations. CEX7-A, CEX3, and CEX7-B show the effect of the temperature of heat treatments. It is shown that the maximum peak position of the Al2p peak is shifted to a lower binding energy from 74.38 eV to 73.98 eV due to the heat treatment at 375° C. (CEX3). This result confirms that $NaAlO_2$ reacts with Li on the surface forming a $LiAlO_2$ phase. EX1 prepared with a lower $NaAlO_2$ content shows the same trend as CEX3 with the maximum peak position of the Al2p peak at 74.08 eV. When the heating temperature is increased to 750° C., the diffusion of Al to the core occurs and an $LiM''_{1-a}Al_aO_2$ phase is formed. This is proved by the shifting of the maximum peak position of the Al2p peak to the lower binding energy (CEX7-B). On the other hand, the maximum peak position of the Al2p peak of CEX7-D remains around the same position as CEX7-C indicating that a heat treatment at 375° C. to dry surface treatment with $Al_2O_3$ powder does not change the Al chemical state. Eventually, the calculated ratio of $LiM''_{1-a}Al_aO_2$, $LiAlO_2$, and $Al_2O_3$ represented by Al peak1, Al peak2, and Al peak3, respectively, is in a good agreement with the maximum peak position of the Al2p peak.

TABLE 8

Al2p peak position and result of peak deconvolution

| ID | Al/M' (at %) | Surface treatment method | Al source | Heat treatment at (° C.) | Maximum peak position of Al2p peaks (eV) | Atomic ratio/M' (at %) Al doped $LiM''O_2$ | $LiAlO_2$ | $Al_2O_3$ |
|---|---|---|---|---|---|---|---|---|
| CEX1-A | 0.00 | — | — | — | — | — | — | — |
| CEX7-A | 1.84 | Wet | $NaAlO_2$ | — | 74.38 | 0.15 | 0.00 | 1.69 |
| CEX3 | 1.84 | Wet | $NaAlO_2$ | 375 | 74.08 | 0.35 | 0.70 | 0.79 |
| CEX7-B | 1.84 | Wet | $NaAlO_2$ | 750 | 72.98 | 1.30 | 0.42 | 0.13 |
| EX1 | 0.36 | Wet | $NaAlO_2$ | 375 | 73.98 | 0.08 | 0.15 | 0.13 |
| CEX7-C | 1.95 | Dry | $Al_2O_3$ | — | 74.58 | 0.02 | 0.06 | 1.88 |
| CEX7-D | 1.95 | Dry | $Al_2O_3$ | 375 | 74.38 | 0.11 | 0.00 | 1.84 |

The peak quantification result for Al is showed in Table 9 along with the ICP result. An Al surface coverage value, defined as the ratio of Al/M* measured by XPS and Al/M* measured by ICP. It is expected that the Al surface coverage is high when Al covers the surface of particles well. Among the list of example and comparative examples showed in Table 9, EX1 has the highest Al surface coverage indicating the process of the surface treatment of EX1 is the most effective. With the same heating temperature, the surface treatment with 0.5% $NaAlO_2$ has a higher coverage value than that with 2.0% $NaAlO_2$ in CEX3. This is directly related with the higher electrochemical performance of EX1 showed in Table 5. Higher temperature treatment in CEX7-B shows a lower Al surface coverage value since Al is likely diffused through the core at the higher temperature and less Al maintains in the surface layer. It is also mentioned earlier that the ratio of an $LiM''_{1-a}Al_aO_2$ phase is higher in the CEX7-B. Similarly, CEX7-A with no heat treatment also gives a low Al surface coverage showing that the choice of the heating temperature is important.

Comparative examples using conventional $Al_2O_3$ powder are added in CEX7-C and CEX7-D each with no heat treatment and heat treatment at 375° C., respectively. Dry surface treatment has a low homogeneity control which consequently, the Al surface coverage value is also lower than the wet process.

TABLE 9

Summary of Al amount on the surface (from XPS), entire particle (from ICP), and calculated coverage value

| ID | Al (wt %) | Surface treatment method | Al source | Heat treatment at (° C.) | Al/M* (at/at) A1 (XPS) | A2 (ICP) | Al surface coverage (A1/A2) |
|---|---|---|---|---|---|---|---|
| CEX1-A | 0.00 | — | — | — | 0.00 | 0.000 | 0 |
| CEX7-A | 0.52 | Wet | $NaAlO_2$ | — | 0.52 | 0.019 | 28 |
| CEX3 | 0.52 | Wet | $NaAlO_2$ | 375 | 0.61 | 0.019 | 32 |
| CEX7-B | 0.52 | Wet | $NaAlO_2$ | 750 | 0.44 | 0.019 | 23 |
| EX1 | 0.10 | Wet | $NaAlO_2$ | 375 | 0.43 | 0.004 | 122 |
| CEX7-C | 0.55 | Dry | $Al_2O_3$ | — | 0.56 | 0.020 | 29 |
| CEX7-D | 0.55 | Dry | $Al_2O_3$ | 375 | 0.57 | 0.020 | 29 |

Figure 8:
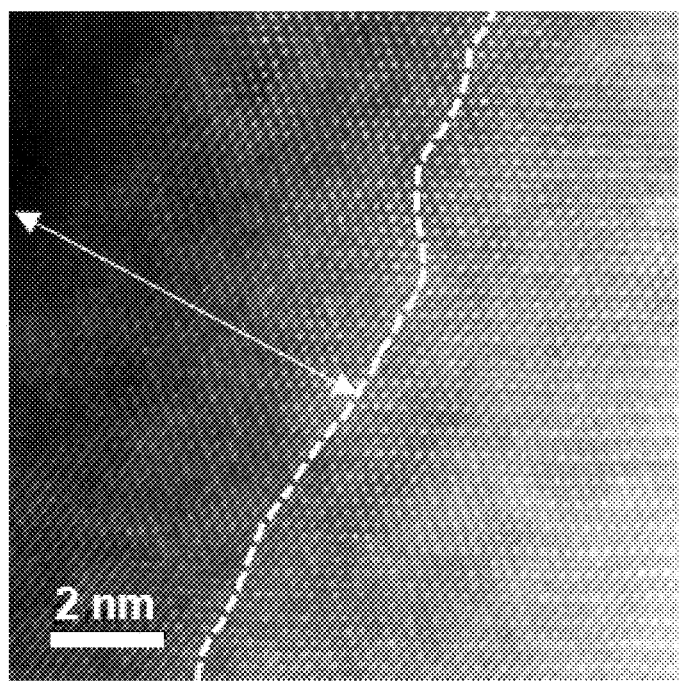
FIG. 8. TEM imaging for EX1 showing crystal structure transition in a direction from the surface layer to the core

The thickness of the surface layer "t" (cfr. FIG. 8) is the minimum linear distance measured from a first point at the periphery of the surface layer of a particle to a second point where a crystal structure transition occurs. The crystal structure transition consists in a transition from mixed cubic and spinel structures in the surface layer to a layered structure in the core of the particle. From the STEM, it is estimated that t of EX1 is of 10 nm.

In the case of a hNMC containing aluminum as a dopant present in its core, meaning before the surface treatment is applied, the amount of aluminum in a surface layer ($Al_{surface}$) with respect to the total amount of aluminum in the positive electrode active material powder after the surface treatment is applied ($Al_{total}$) of the hNMC according to the invention is obtained by the following procedure:

1) Firstly, the total amount of aluminum in the positive electrode active material powder ($Al/M^*_{ICP}$) is obtained by ICP analysis.
2) Secondly, an line profile of a cross section of a particle is measured by techniques such as EDS and/or EELS (Electron Energy Loss Spectroscopy).
3) Thirdly, the thickness of the surface layer is is the minimum linear distance D measured from a first point at the periphery of the surface layer of a particle to a second point where a crystal structure transition occurs.
4) Fourthly, an Area1 parameter is obtained by integrating Al/M* on a distance in the surface layer in the one-dimensional line profile and an Area2 parameter is obtained by integrating Al/M* by a distance from the external edge of the surface layer to the center of a particle. Assuming that a particle is spherical and the surface layer is uniform, Area1 and Area2 are used to calculate the atomic ratio of $Al_{surface}$ to $Al_{total}$ by a following equation.

$$Al_{surface}/Al_{total} = \frac{\frac{4}{3}\pi(\text{Area 2})^3 - \frac{4}{3}\pi(\text{Area 2} - \text{Area 1})^3}{\frac{4}{3}\pi(\text{Area 2})^3} \times 100 (at\ \%)$$

The amount of aluminum in a surface layer with respect to total atomic content of M' in the positive electrode active material powder is obtained by multiplying the $Al/M^*_{ICP}$ ratio to the $Al_{surface}/Al_{total}$ ratio, according to the following equation: $Al/M^*_{ICP} * Al_{surface}/Al_{total}$.

In particular, Al is present in the surface layer in a content I defined as:

$$I(\text{mol }\%) = \left(\frac{Al}{M^*}\right)_{ICP} \times (Al_{surface}/Al_{total}),$$

with:

$$\left(\frac{Al}{M^*}\right)_{ICP}$$

is the atomic ratio of Al content on M* content in the powder measured by ICP, wherein M* is a total atomic content of Ni, Mn, Co, Al and S and $$Al_{surface}/Al_{total} = \frac{\frac{4}{3}\pi(\text{Area 2})^3 - \frac{4}{3}\pi(\text{Area 2} - \text{Area 1})^3}{\frac{4}{3}\pi(\text{Area 2})^3} \times 100$$

wherein:
$Al_{surface}$ is the content of Al in at % in the surface layer measured by EDS;
$Al_{total}$ the total content of Al in at % in the particles of said powder measured by EDS;
Area1 is the integral of the Al/M* content measured by cross-section-TEM-EDS over D:

$$\text{Area 1}(at\ \%/at\ \%) = \int_{x=0}^{x=D} \frac{Al}{M^*}(x),$$

where:
Al(x) is the atomic content of Al at a point x of a cross sectional particle measured by cross-section-TEM EDS,
M*(x) is the atomic content of Ni, Mn, Co, Al, and S, at a point x of a cross sectional particle measured by cross-section-TEM EDS, and
x is the distance expressed in nm measured by TEM between a first and a second point locations defining the thickness of the surface,
Area2 is the integral of the Al/M* content measured by cross-SEM EDS over a distance C:

$$\text{Area 2}(at\ \%/at\ \%) = \int_{x=0}^{x=C} \frac{Al}{M^*}(x),$$

where:
Al(x) is the atomic content of Al at a point x of a cross sectional particle measured by cross-section-TEM EDS,
M*(x) is the atomic content of Ni, Mn, Co, Al, and S, at a point x of a cross sectional particle measured by cross-section-TEM EDS, and
x is the distance expressed in nm and measured by TEM between said first point location (at x=0 nm) and the geometric center of said particle (at x=C), wherein C preferably ranges from 2.0 μm to 10.0 μm.

Comparative Example 8

A polycrystalline hNMC powder having a Ni to M' atomic ratio of 86 at % with a formula $Li_{1+a}(Ni_{0.86}Mn_{0.04}Co_{0.10})_{1-a}O_2$ is prepared to identify the surface treatment effect as follows: 1) Co-precipitation: a transition metal-based hydroxide precursor $M'O_{0.16}(OH)_{1.84}$ with metal composition $M'=Ni_{0.86}Mn_{0.04}Co_{0.10}$ is prepared by a co-precipitation process in a CSTR with mixed nickel-manganese-cobalt sulfates, sodium hydroxide, and ammonia.

2) Blending: to obtain an intermediate product, the mixed transition metal-based precursor prepared from Step 1) and LiOH.H$_2$O as a lithium source are homogenously blended at a Li/M' ratio of 1.02 in an industrial blending equipment.

3) Sintering: the blend is sintered at 765° C. for 12 hours under an oxygen atmosphere. After the sintering, the sintered powder is classified and sieved so as to obtain a non-agglomerated hNMC powder.

The final hNMC powder, which named CEX8, has the formula $Li_{1.002}M'_{0.998}O_2$ and its D50 and span are 11.2 μm and 0.53, respectively. CEX8 is not according to the present invention.

CEX8 is not according to the present invention.

Example 3

EX3 is prepared by the following procedure: 1 kg of CEX8 is blended with an aluminum and sulfate ion solution, which is prepared by dissolving 11.68 g $Al_2(SO_4)_3 \cdot 16H_2O$ into 29.66 mL deionized water. The prepared blend is heated at 375° C. for 8 hours under an oxygen atmosphere. After heating, the powder is crushed, classified, and sieved so as to obtain CEX8. Accordingly, the hNMC compound, EX3, contains about 1000 ppm Al with respect to the total weight of EX3.

EX3 is according to the present invention.

The electrochemical performance of EX3 and CEX8 is evaluated by the same method as Example 1. The initial discharge capacities and irreversible capacities are shown in Table 8.

TABLE 10

Summary of the surface treatment condition and electrochemical properties of polycrystalline hNMC powder having a Ni to M' atomic ratio of 86at %

| ID | According to Invention | Al (wt %) | Surface treatment method | Heat treatment at (° C.) | DQ1 (mAh/g) | QF1C (%) | Link to features of claim |
|---|---|---|---|---|---|---|---|
| CEX8 | No | 0.00 | — | — | 207.6 | 7.8 | High Ni, low Al |
| EX3 | Yes | 0.10 | wet | 375 | 212.3 | 10.0 | High Ni, Al |

As shown in Table 8, hNMC compound (EX3) with the atomic ratio of Ni to M' as high as 0.86 exhibits a higher DQ1 and QF1C improvement in comparison with CEX8. The observation indicates surface treatment can be applied for the composition with atomic ratio of Ni to M' of 0.86.

The invention claimed is:

1. A positive electrode active material powder suitable for lithium-ion batteries, comprising lithium transition metal-based oxide particles comprising
   a core and
   a surface layer, said surface layer being on top of said core,
   said particles comprising the elements: Li, a metal M' and oxygen, wherein the metal M' has a formula: M'=$(Ni_zMn_yCo_x)_{1-k}A_k$, wherein A is a dopant, $0.50 \leq z \leq 0.89$, $0.05 \leq y \leq 0.25$, $0.05 \leq x \leq 0.25$, $x+y+z+k=1$, and $k \leq 0.01$,
   said positive electrode active material powder having a median particle size D50 ranging from 3 μm to 15 μm and a surface layer thickness ranging from 5 nm to 200 nm,
   said surface layer comprising aluminum in a content superior or equal to 0.04 wt % and inferior or equal to 0.15 wt % with respect to the total weight of the positive electrode active material powder, and having an Al surface coverage A1/A2 that is superior or equal to 100, wherein A1 is an atomic ratio Al/(Ni+Mn+Co+Al+S) of the elements Al, Ni, Mn, Co, and S contained in the surface layer, said atomic ratio A1 obtained by XPS spectrum analysis, and wherein A2 is an atomic ratio Al/(Ni+Mn+Co+Al+S) of the elements Al, Ni, Mn, Co, and S contained in the surface layer, obtained by ICP;
   said surface layer comprising a $LiAlO_2$ phase and a LiM"$O_2$ phase with M" comprising Al, Ni, Mn, and Co,
   said $LiAlO_2$ phase being present in said surface layer in a content which is superior or equal to 0.10at % and inferior or equal to 0.30at % with respect to the total atomic content of M' of the positive electrode active material powder,
   said LiM"$O_2$ phase being present in a content which is superior to 0.00at % and inferior to 0.14at % with respect to the total atomic content of M' of the positive electrode active material powder.

2. The positive electrode active material powder according to claim 1, wherein said core comprising the elements: Li, M' and oxygen, wherein M' has a formula: M'=$Ni_zMn_yCo_xA_k$, wherein A is a dopant, $0.60 \leq z \leq 0.86$, $0.05 \leq y \leq 0.25$, $0.05 \leq x \leq 0.25$, $x+y+z+k=1$, and $k \leq 0.01$.

3. The positive electrode active material powder according to claim 1, wherein said surface layer has a maximum Al2p peak intensity in the range of binding energies going from $73.0 \pm 0.2$ eV to $74.5 \pm 0.2$ eV, said intensity obtained by XPS spectrum analysis.

4. The positive electrode active material powder according to claim 1, having a general formula: $Li_{1+a}((Ni_zMn_yCo_xAl_v)_{1-k}A_k)_{1-a}O_2$, wherein only A is a dopant, wherein $0.50 \leq z' \leq 0.89$, $0.05 \leq y' \leq 0.25$, $0.05 \leq x' \leq 0.25$, $x'+y'+Z'+v+k=1$, $0.0014 \leq v \leq 0.0054$, $-0.05 \leq a' \leq 0.05$, and $k \leq 0.01$.

5. The positive electrode active material powder according to claim 1, wherein A comprises one or more of Al, B, S, Mg, Zr, Nb, W, Si, Ba, Sr, Ca, Zn, Cr, V, Y, or Ti.

6. The positive electrode active material powder according to claim 1 comprising a polycrystalline morphology having a span ranging from 0.25-0.90.

7. Process for manufacturing the positive electrode active material powder according to claim 1, comprising the consecutive steps of:

a) preparing a lithium transition metal-based oxide compound,
b) mixing said lithium transition metal-based oxide compound with a source of aluminum ion, thereby obtaining a mixture, and
c) heating the mixture in an oxidizing atmosphere in a furnace at a temperature between 350° C. and less than 500° C., for a time between 1 hour and 10 hours so as to obtain said positive electrode active material powder.

8. A battery comprising the positive electrode active material powder according to claim 1.

9. An electric vehicle or a hybrid electric vehicles comprising the battery according to claim 8.

* * * * *

UNITED STATES PATENT AND TRADEMARK OFFICE
CERTIFICATE OF CORRECTION

| | |
|---|---|
| PATENT NO. | : 12,294,078 B2 |
| APPLICATION NO. | : 17/623688 |
| DATED | : May 6, 2025 |
| INVENTOR(S) | : Shinichi Kumakura et al. |

It is certified that error appears in the above-identified patent and that said Letters Patent is hereby corrected as shown below:

On the Title Page

Item (54) TITLE and in the Specification, Column 1, Lines 1-3: The title, "AS A POSITIVE ELECTRODE ACTIVE MATERIAL FOR RECHARGEABLE LITHIUM ION BATTERIES" should be replaced with --LITHIUM NICKEL MANGANESE COBALT COMPOSITE OXIDE AS A POSITIVE ELECTRODE ACTIVE MATERIAL FOR RECHARGEABLE LITHIUM ION BATTERIES--

Signed and Sealed this
Seventeenth Day of June, 2025

Coke Morgan Stewart
*Acting Director of the United States Patent and Trademark Office*